US012671505B2

(12) United States Patent
Huang

(10) Patent No.: US 12,671,505 B2
(45) Date of Patent: Jun. 30, 2026

(54) RADIO FREQUENCY DEVICE CALIBRATION METHOD

(71) Applicant: TMY Technology Inc., Taipei City (TW)

(72) Inventor: Po-Chia Huang, Taipei City (TW)

(73) Assignee: TMY Technology Inc., Taipei City (TW)

( * ) Notice: Subject to any disclaimer, the term of this patent is extended or adjusted under 35 U.S.C. 154(b) by 328 days.

(21) Appl. No.: 18/523,791

(22) Filed: Nov. 29, 2023

(65) Prior Publication Data

US 2024/0204890 A1 Jun. 20, 2024

(30) Foreign Application Priority Data

Dec. 16, 2022 (TW) ................................. 111148478

(51) Int. Cl.
*H04B 17/19* (2015.01)
*H04B 17/11* (2015.01)

(52) U.S. Cl.
CPC ............. *H04B 17/19* (2015.01); *H04B 17/11* (2015.01)

(58) Field of Classification Search
CPC ......... H04B 17/21; H04B 17/11; H04B 17/19
See application file for complete search history.

(56) References Cited

U.S. PATENT DOCUMENTS

| | | | | |
|---|---|---|---|---|
| 5,477,229 | A | 12/1995 | Caille et al. | |
| 8,319,502 | B2 * | 11/2012 | Hashimshony ...... | G01R 35/007 |
| | | | | 324/601 |

(Continued)

FOREIGN PATENT DOCUMENTS

| | | |
|---|---|---|
| CN | 113240667 | 8/2021 |
| JP | H08307465 | 11/1996 |

(Continued)

OTHER PUBLICATIONS

Toru Takahashi, "Statistical Radiation Pattern Analysis and Calibration Technologies for Phased Array Antennas", Journal of the Institute of Electronics, Information and Communication Engineers B, Jun. 8, 2017, with English abstract, pp. 748-763, vol. J100-B, No. 9.

(Continued)

*Primary Examiner* — Tuan H Nguyen
(74) *Attorney, Agent, or Firm* — JCIPRNET

(57) ABSTRACT

An embodiment of the invention provides a radio frequency (RF) device calibration method. The method includes: obtaining a measurement result of a channel of a first-stage device under a control condition; obtaining a reference measurement result of a reference channel of a second-stage device, wherein the channel corresponds to the reference channel, and the measurement result and the reference measurement result are measured before the first-stage device and the second-stage device are assembled into an RF device; determining an estimated measurement result corresponding to the channel based on the measurement result and the reference measurement result; obtaining a post-assembly measurement result of the channel of the RF device under the control condition after the first-stage device and the second-stage device are assembled into the RF device; and performing a calibration operation corresponding to the channel based on the estimated measurement result and the post-assembly measurement result.

9 Claims, 3 Drawing Sheets

(56) References Cited

U.S. PATENT DOCUMENTS

| | | | | |
|---|---|---|---|---|
| 9,729,110 | B2 * | 8/2017 | Geng | H03F 3/20 |
| 2009/0109085 | A1 | 4/2009 | Needham et al. | |
| 2009/0264090 | A1 | 10/2009 | Ivonnet et al. | |
| 2009/0322347 | A1 | 12/2009 | Hashimshony et al. | |
| 2012/0314784 | A1 | 12/2012 | Pratt et al. | |
| 2017/0181166 | A1 | 6/2017 | Ananda et al. | |
| 2018/0288723 | A1 | 10/2018 | Cai et al. | |
| 2019/0059060 | A1 | 2/2019 | Chen et al. | |
| 2020/0328829 | A1 | 10/2020 | Papadopoulos | |
| 2022/0182156 | A1 | 6/2022 | Chen et al. | |

FOREIGN PATENT DOCUMENTS

| | | |
|---|---|---|
| JP | 2002141730 | 5/2002 |
| KR | 20180109373 | 10/2018 |
| TW | 201603480 | 1/2016 |
| TW | 1721614 | 3/2021 |
| WO | 2006093177 | 9/2006 |

OTHER PUBLICATIONS

"Notice of allowance of Japan Counterpart Application", issued on Jan. 16, 2025, p. 1-p. 4.

Hsin-Chia Lu et al., "Flip-Chip-Assembled W-Band CMOS Chip Modules on Ceramic Integrated Passive Device with Transition Compensation for Millimeter-Wave System-in-Package Integration", IEEE Transactions on Microwave Theory and Techniques, vol. 60, No. 3, Mar. 1, 2012, pp. 766-777.

Yifei Zhang et al., "95-GHz Front-End Receiving Multichip Module on Multilayer LCP Substrate for Passive Millimeter-Wave Imaging", IEEE Transactions on Components, Packaging and Manufacturing Technology, vol. 8, No. 12, Dec. 1, 2018, pp. 2180-2189.

Haoyi Dong et al., "A Low-Loss Fan-Out Wafer-Level Package with a Novel Redistribution Layer Pattern and Its Measurement Methodology for Millimeter-Wave Application", IEEE Transactions on Components, Packaging and Manufacturing Technology, vol. 10, No. 7, Jun. 4, 2020, pp. 1073-1078.

* cited by examiner

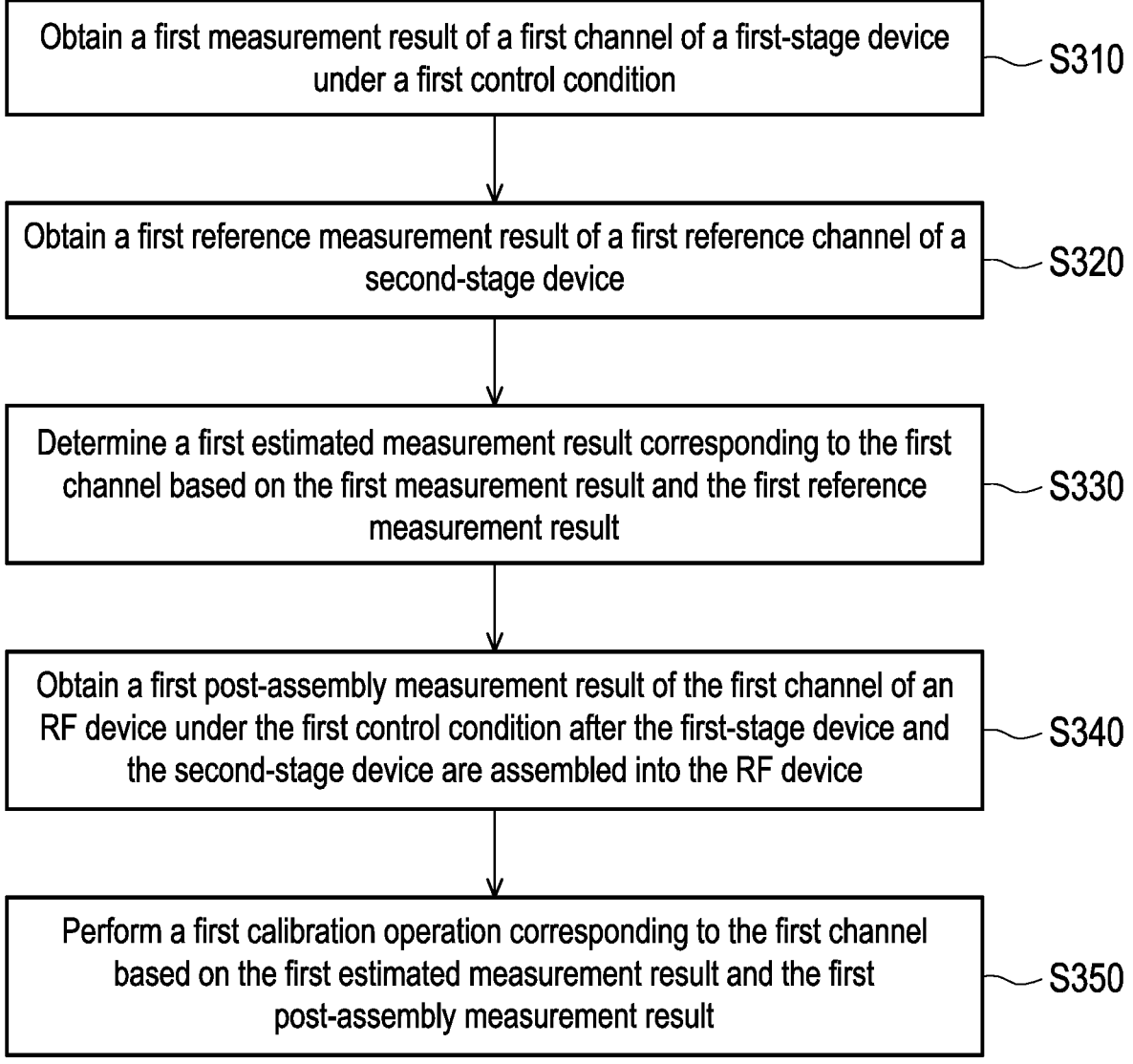

Obtain a first measurement result of a first channel of a first-stage device under a first control condition ～S310

Obtain a first reference measurement result of a first reference channel of a second-stage device ～S320

Determine a first estimated measurement result corresponding to the first channel based on the first measurement result and the first reference measurement result ～S330

Obtain a first post-assembly measurement result of the first channel of an RF device under the first control condition after the first-stage device and the second-stage device are assembled into the RF device ～S340

Perform a first calibration operation corresponding to the first channel based on the first estimated measurement result and the first post-assembly measurement result ～S350

FIG. 3

RADIO FREQUENCY DEVICE CALIBRATION METHOD

CROSS-REFERENCE TO RELATED APPLICATION

This application claims the priority benefit of Taiwan application serial no. 111148478, filed on Dec. 16, 2022. The entirety of the above-mentioned patent application is hereby incorporated by reference herein and made a part of this specification.

BACKGROUND OF THE INVENTION

Field of the Invention

The invention relates to a radio frequency technique, and in particular to a radio frequency device calibration method.

Description of Related Art

Please refer to FIG. 1. FIG. 1 shows a schematic diagram of a multi-stage radio frequency (RF) device. In FIG. 1, an RF device 10 may include RF elements RFU1 to RFUN belonging to the first stage and a multiplexer 11 belonging to the second stage. Each of the RF elements RFU1 to RFUN is, for example, an RF circuit board, and the RF circuit board may have one or a plurality of (RF) channels. In addition, the multiplexer 11 is, for example, a power divider or a combiner including one or a plurality of (RF) channels, but may not be limited thereto.

For an RF device, errors caused by crosstalk between multiple groups of RF signals and/or matching between multi-stage elements need to be suppressed or reduced by calibration. In general, when the RF device 10 is calibrated, the RF devices RFU1 to RFUN and the multiplexer 11 need to be assembled into the RF device 10 first, and then the RF device 10 is calibrated as a whole. However, this approach consumes a lot of time and is inefficient.

SUMMARY OF THE INVENTION

Accordingly, the invention provides a radio frequency (RF) device calibration method that may be used to solve the above technical issues.

An embodiment of the invention provides an RF device calibration method, including: obtaining a first measurement result of a first channel of a first-stage device under a first control condition; obtaining a first reference measurement result of a first reference channel of a second-stage device, wherein the first channel corresponds to the first reference channel, and the first measurement result and the first reference measurement result are measured before the first-stage device and the second-stage device are assembled into an RF device; determining a first estimated measurement result corresponding to the first channel based on the first measurement result and the first reference measurement result; obtaining a first post-assembly measurement result of the first channel of the RF device under the first control condition after the first-stage device and the second-stage device are assembled into the RF device; and performing a first calibration operation corresponding to the first channel based on the first estimated measurement result and the first post-assembly measurement result.

BRIEF DESCRIPTION OF THE DRAWINGS

FIG. 3 is a flowchart of an RF device calibration method shown according to an embodiment of the invention.

DESCRIPTION OF THE EMBODIMENTS

Figures 1, 2:
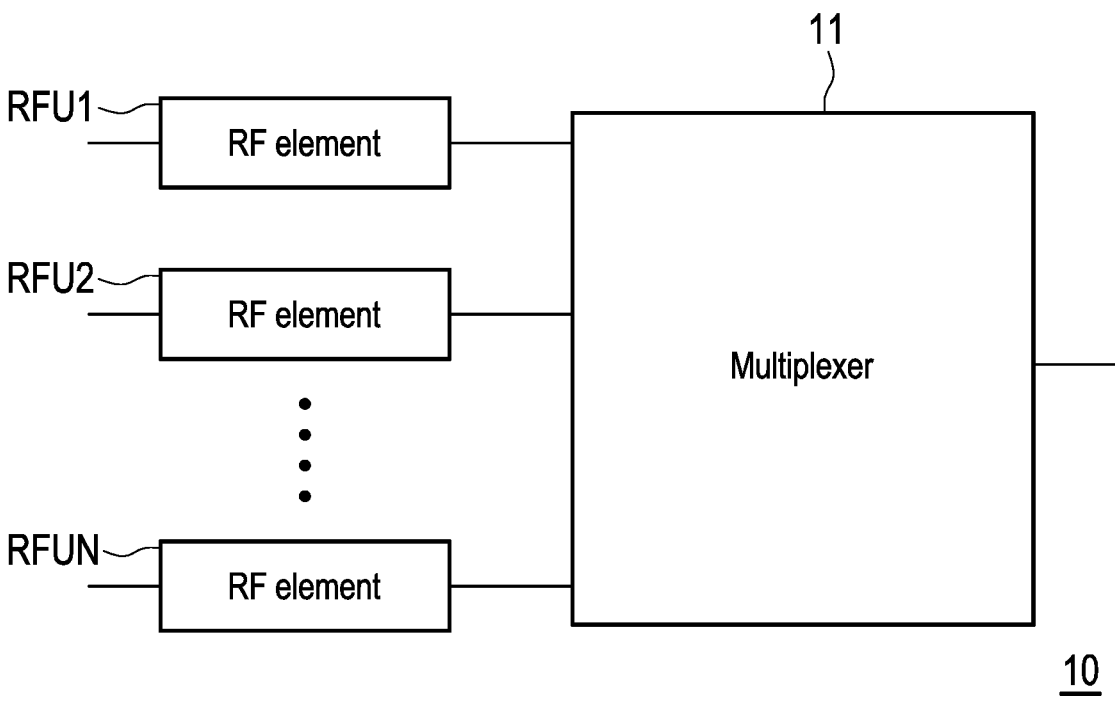
FIG. 1 shows a schematic diagram of a multi-stage RF device.
FIG. 2 is a calibration device schematic shown according to an embodiment of the invention.

Referring to FIG. 2, FIG. 2 is a schematic diagram of a calibration device shown according to an embodiment of the invention. In different embodiments, a calibration device 200 may be implemented as various smart devices and/or computer devices. In some embodiments, the calibration device 200 may be implemented as an equipment dedicated to calibrating a radio frequency (RF) device, but is not limited thereto.

In FIG. 2, the calibration device 200 includes a storage circuit 202 and a processor 204. The storage circuit 202 is, for example, any type of fixed or removable random-access memory (RAM), read-only memory (ROM), flash memory, hard disk, or other similar devices or a combination of these devices, and may be used to record a plurality of program codes or modules.

The processor 204 is coupled to the storage circuit 202 and may be a general-purpose processor, a special-purpose processor, a conventional processor, a digital signal processor, a plurality of microprocessors, one or a plurality of microprocessors combining digital signal processor cores, a controller, a microcontroller, an application-specific integrated circuit (ASIC), a field-programmable gate array (FPGA), any other types of integrated circuits, a state machine, a processor based on advanced RISC machine (ARM), and a similar product thereof.

In an embodiment of the invention, the processor 204 may access the modules and program codes recorded in the storage circuit 202 to implement the RF device calibration method proposed by the invention. The details are as follows.

Please refer to FIG. 3. FIG. 3 is a flowchart of an RF device calibration method shown according to an embodiment of the invention. The method of the present embodiment may be performed by the calibration device 200 of FIG. 2, and the details of each step of FIG. 3 are described below with the elements shown in FIG. 2. In addition, in order to facilitate the understanding of the concept of the invention, it is assumed that the object calibrated by the calibration device 200 is the RF device 10 in FIG. 1, but may be not limited thereto.

First, in step S310, the processor 204 obtains a first measurement result (hereinafter referred to as M1) of a first channel of a first-stage device under a first control condition. In the present embodiment, the first-stage device is, for example, one of the RF elements RFU1 to RFUN in FIG. 1. For ease of description, it is assumed that the considered first-stage device is the RF element RFU1, but may be not limited thereto.

Figure 4:
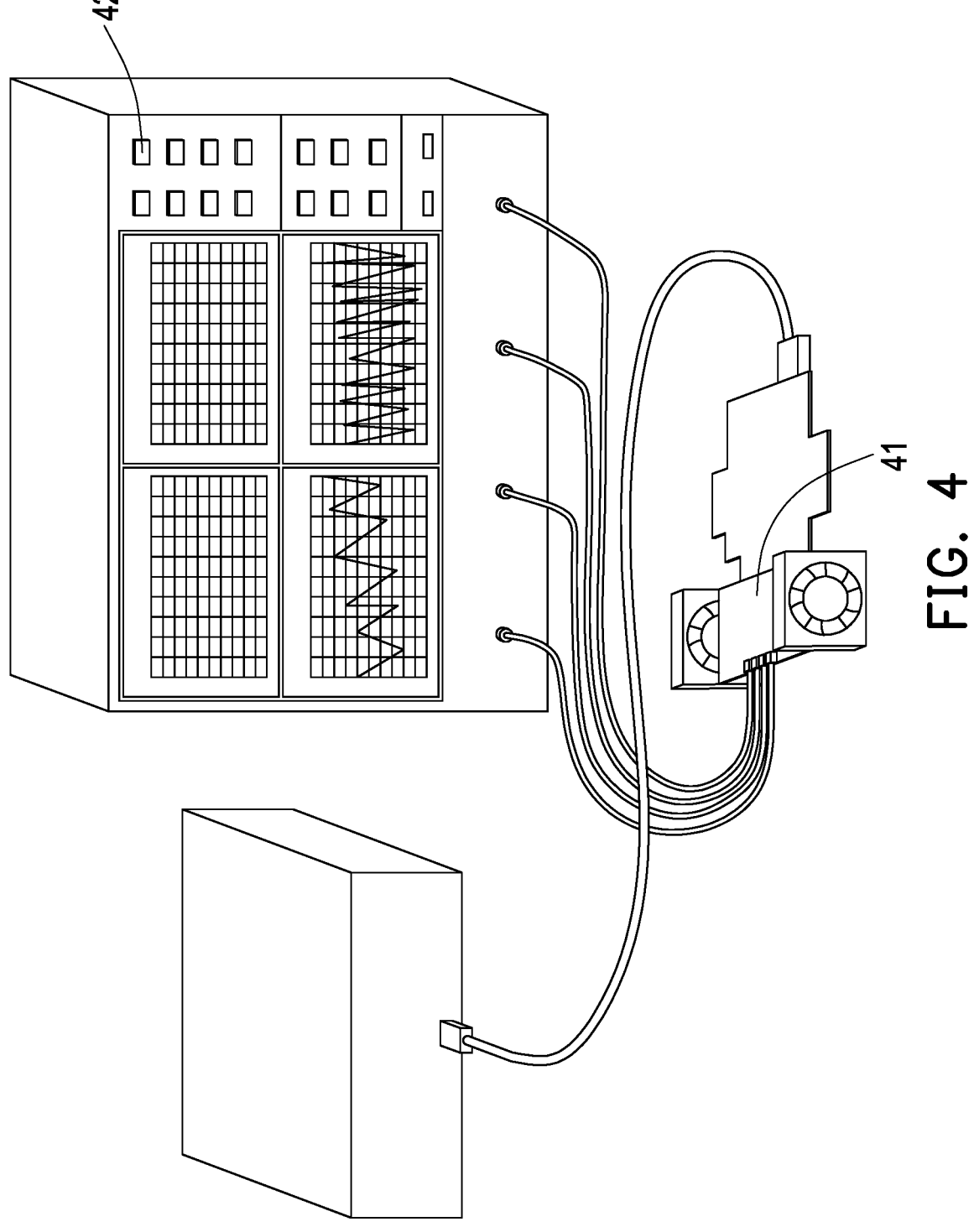
FIG. 4 is a schematic diagram of obtaining a measurement result shown according to an embodiment of the invention.

Please refer to FIG. 4. FIG. 4 is a schematic diagram of obtaining a measurement result shown according to an embodiment of the invention. In FIG. 4, a tester may, for example, connect a device 41 to be tested to an oscilloscope 42, and then perform a corresponding measurement on the device 41 to be tested. In an embodiment, the device 41 to be tested is, for example, the considered first-stage device (such as the RF element RFU1), but may be not limited thereto.

In an embodiment of the invention, it is assumed that the RF element RFU1 has one or a plurality of (RF) channels, and the first channel is, for example, one of the channels of the RF element RFU1. For ease of explanation, in the following, it is assumed that the RF element RFU1 includes 4 channels (hereinafter referred to as CH11 to CH14), and the first channel is, for example, the channel CH11 thereof, but may be not limited thereto.

Moreover, the first control condition is, for example, one of a plurality of control conditions predetermined by the designer, and different control conditions may have different configurations, parameters, and/or environments, for example, but may be not limited thereto.

In an embodiment of the invention, the first measurement result M1 is, for example, measured before the RF element RFU1 (and other RF elements) and the multiplexer 11 are assembled into the RF device 10. In an embodiment, the first measurement result M1 may include a first gain and a first phase of the first channel under the first control condition (e.g., the gain and phase of the channel CH11), but may be not limited thereto.

In addition, the processor 204 may also obtain measurement results of other channels on the first-stage device under the first control condition. For example, the processor 204 may obtain the gains and phases corresponding to the channels CH12 to CH14 of the RF element RFU1 as the corresponding measurement results, but may be not limited thereto.

In an embodiment, the processor 204 may also obtain the measurement result of each channel of the first-stage device under other control conditions (e.g., second to fourth control conditions different from the first control condition).

In an embodiment, the corresponding measurement results of the channels CH11 to CH14 of the RF element RFU1 under different first to fourth control conditions are shown in Table 1 below.

TABLE 1

| Control condition | Channel | Gain (dB) | Phase (degrees) |
|---|---|---|---|
| First control condition | CH11 | 21.75 | −114.26 |
| | CH12 | 19.38 | −117.59 |
| | CH13 | 21.82 | −110.96 |
| | CH14 | N/A | N/A |
| Second control condition | CH11 | 16.62 | −113.4 |
| | CH12 | 14.19 | −116.78 |
| | CH13 | 16.67 | −110.07 |
| | CH14 | N/A | N/A |
| Third control condition | CH11 | 8.67 | −111.82 |
| | CH12 | 11.81 | −115.99 |
| | CH13 | 15.77 | −109.75 |
| | CH14 | N/A | N/A |
| Fourth control condition | CH11 | 8.86 | −26.84 |
| | CH12 | 12.05 | 147.46 |
| | CH13 | 16.33 | 69.62 |
| | CH14 | N/A | N/A |

In an embodiment, the RF element RFU1 has a corresponding key code and/or MAC address for identification by the calibration device 200. Accordingly, after the above measurement results of the RF element RFU1 are obtained, these measurement results may be marked as the code and/or MAC address corresponding to the RF element RFU1 and stored in the storage circuit 202. In an embodiment, when the processor 204 is to access the measurement results associated with the RF element RFU1, the corresponding measurement results may be found in the storage circuit 202 according to the code and/or MAC address of the RF element RFU1 for subsequent analysis, but may be not limited thereto.

In another embodiment, the RF element RFU1 may have a built-in storage medium (e.g., electronically erasable and rewritable read-only memory (EEPROM)). In this case, after the measurement of the RF element RFU1 is completed to obtain the above measurement results, these measurement results may be written into the storage medium in the RF element RFU1. Accordingly, when the RF element RFU1 is assembled into the RF device 10 in the future, the measurement results stored in the storage medium may be reused for other analysis, but may be not limited thereto.

For other RF elements, the relevant measurement results may also be stored in the storage circuit 202 and/or in the built-in storage medium of each RF element based on the above teaching, but may be not limited thereto.

Moreover, in the case of Table 1, the considered second control condition may for example have the same phase as the first control condition, but the gain corresponding to the second control condition is 5 dB lower than the gain corresponding to the first control condition. Moreover, in the case of Table 1, compared with the gains of the second control condition on the channels CH11 to CH14, the gains of the considered third control condition on the channels CH1 to CH14 are respectively reduced by 7.5 dB, 2.5 dB, 1 dB, and 0 dB. In the case of Table 1, compared with the phases of the third control condition on the channels CH11 to CH14, the phases of the considered fourth control condition on the channels CH11 to CH14 are respectively adjusted by 90 degrees, 270 degrees, 180 degrees, and 0 degrees.

In step S320, the processor 204 obtains a first reference measurement result (hereinafter referred to as RM1) of the first reference channel of the second-stage device. In the present embodiment, the second-stage device is, for example, the multiplexer 11 (such as a frequency divider) in FIG. 1, but may be not limited thereto.

In an embodiment, the tester may also obtain the first reference measurement result of the multiplexer 11 based on the situation shown in FIG. 4. For example, the tester may replace the device 41 to be tested in FIG. 4 with the multiplexer 11 and connect the multiplexer 11 to the oscilloscope 42, and then perform a corresponding measurement on the multiplexer 11 to obtain the first reference measurement result, but may be not limited thereto.

In an embodiment of the invention, it is assumed that the multiplexer 11 also has one or a plurality of (RF) reference channels, and the first reference channel is, for example, one of the reference channels of the multiplexer 11. For ease of explanation, in the following, it is assumed that the multiplexer 11 includes 4 reference channels (hereinafter referred to as RCH1 to RCH4), and the first reference channel is, for example, the reference channel RCH1 thereof, but may be not limited thereto.

In an embodiment of the invention, the first reference measurement result RM1 is, for example, measured before the RF element RFU1 (and other RF elements) and the multiplexer 11 are assembled into the RF device 10. In an embodiment, the first reference measurement result RM1 may include the first reference channel gain and phase (e.g., the gain and phase of the reference channel RCH1), but may be not limited thereto.

In an embodiment, the reference measurement results of the reference channels RCH1 to RCH4 of the multiplexer 11 may be shown in Table 2 below.

TABLE 2

| Multiplexer | Reference channel | Gain (dB) | Phase (degrees) |
|---|---|---|---|
| Frequency divider | RCH1 | −8.2 | −85.18 |
| | RCH2 | −8.55 | −84.63 |
| | RCH3 | −8.79 | −80.67 |
| | RCH4 | N/A | N/A |

In another embodiment, the second-stage device may also be implemented as other RF elements (hereinafter referred to as reference RF elements) different from the RF elements RFU1 to RFUN. In this case, the processor 204 may also obtain the measurement results of the reference channels RCH1 to RCH4 on the reference RF element under different control conditions (for example, first to fourth control conditions) as corresponding reference measurement results, and these reference measurement results may be presented as another table having a structure similar to Table 1, but may be not limited thereto.

In an embodiment, the multiplexer 11 has a corresponding key code and/or MAC address for identification by the calibration device 200. Accordingly, after the above measurement results of the multiplexer 11 are obtained, these measurement results may be marked as the code and/or MAC address corresponding to the multiplexer 11 and stored in the storage circuit 202. In an embodiment, when the processor 204 is to access the measurement results associated with the multiplexer 11, the corresponding measurement results may be found in the storage circuit 202 according to the code and/or MAC address of the multiplexer 11 for subsequent analysis, but may be not limited thereto.

In another embodiment, the multiplexer 11 may have a built-in storage medium (e.g., EEPROM). In this case, after the measurement of the multiplexer 11 is completed to obtain the above measurement results, these measurement results may be written into the storage medium in the multiplexer 11. Accordingly, when the multiplexer 11 is assembled into the RF device 10 in the future, the measurement results stored in the storage medium may be reused for other analysis, but may be not limited thereto.

In step S330, the processor 204 determines a first estimated measurement result (hereinafter referred to as EM1) corresponding to the first channel based on the first measurement result M1 and the first reference measurement result RM1.

In an embodiment, the processor 204 may obtain the first measurement result M1 and/or the first reference measurement result RM1 from the storage circuit 202, for example, or respectively obtain the first measurement result M1 and the first reference measurement result RM1 from the storage medium of the RF element RFU1 and the storage medium of the multiplexer 11, but may be not limited thereto.

For example, the processor 204 may obtain the first measurement result M1 and/or the first reference measurement result RM1 from the storage circuit 202 after the RF element RFU1 and the multiplexer 11 are assembled into the RF device 10, or respectively obtain the first measurement result M1 and the first reference measurement result RM1 from the storage medium of the RF element RFU1 and the storage medium of the multiplexer 11, but may be not limited thereto.

In an embodiment, the processor 204 may obtain the first estimated measurement result EM1 corresponding to the first channel by adding the first measurement result M1 and the first reference measurement result RM1. In addition, the processor 204 may also obtain estimated measurement results corresponding to other channels in a similar manner.

In an embodiment of the invention, the processor 204 may, for example, add (partial) contents of Table 1 and Table 2 to obtain the first estimated measurement result EM1 and the estimated measurement results corresponding to other channels, and the obtained first estimated measurement result EM1 and the estimated measurement results corresponding to other channels are shown in Table 3 below.

TABLE 3

| Control condition | Channel | Gain (dB) | Phase (degrees) |
|---|---|---|---|
| First control condition | CH11 + RCH1 | 13.55 | −199.44 |
| | CH12 + RCH1 | 11.18 | −202.77 |
| | CH13 + RCH1 | 13.62 | −196.14 |
| | CH14 + RCH1 | N/A | N/A |
| Second control condition | CH11 + RCH1 | 8.42 | −198.58 |
| | CH12 + RCH1 | 5.99 | −201.96 |
| | CH13 + RCH1 | 8.47 | −195.25 |
| | CH14 + RCH1 | N/A | N/A |
| Third control condition | CH11 + RCH1 | 0.47 | −197 |
| | CH12 + RCH1 | 3.61 | −201.17 |
| | CH13 + RCH1 | 7.57 | −194.93 |
| | CH14 + RCH1 | N/A | N/A |
| Fourth control condition | CH11 + RCH1 | 0.66 | −112.02 |
| | CH12 + RCH1 | 3.85 | 62.28 |
| | CH13 + RCH1 | 8.13 | −15.56 |
| | CH14 + RCH1 | N/A | N/A |

In the scenario in Table 3, it is assumed that in the process of assembling the RF device 10, the channels CH11 to CH14 of the RF element RFU1 are expected to all be connected to the reference channel RCH1 of the multiplexer 11, but may be not limited thereto.

In this case, the processor 204 may add the gain corresponding to the reference channel RCH1 in Table 2 to the gain in each row of Table 1 to obtain the gain in each row of Table 3. Similarly, the processor 204 may add the phase corresponding to the reference channel RCH1 in Table 2 to the phase in each row of Table 1 to obtain the phase in each row of Table 3, but may be not limited thereto.

For example, in the first estimated measurement result EM1 of Table 3, the gain (i.e., 13.55) of the channel "CH11+RCH1" under the first control condition is, for example, the sum of the gain (i.e., 21.75) of the channel CH11 under the first control condition in Table 1 and the gain (i.e., −8.2) of the reference channel RCH1 in Table 2. Moreover, in the first estimated measurement result EM1 of Table 3, the phase (i.e., −199.44) of the channel "CH11+RCH1" under the first control condition is, for example, the sum of the phase (i.e., −114.26) of the channel CH11 under the first control condition in Table 1 and the phase (i.e., −85.18) of the reference channel RCH1 in Table 2.

Moreover, in the first estimated measurement result EM1 of Table 3, the gain (i.e., 8.42) of the channel "CH11+RCH1" under the second control condition is, for example, the sum of the gain (i.e., 16.62) of the channel CH11 under the first control condition in Table 1 and the phase (i.e., −8.2) of the reference channel RCH1 in Table 2. Moreover, in the first estimated measurement result EM1 of Table 3, the phase (i.e., −198.58) of the channel "CH11+RCH1" under the second control condition is, for example, the sum of the phase (i.e., −113.4) of the channel CH11 under the second control condition in Table 1 and the phase (i.e., −85.18) of the reference channel RCH1 in Table 2.

As another example, in the first estimated measurement result EM1 of Table 3, the gain (i.e., 11.18) of the channel "CH12+RCH1" under the first control condition is, for example, the sum of the gain (i.e., 19.38) of the channel CH12 under the first control condition in Table 1 and the gain (i.e., −8.2) of the reference channel RCH1 in Table 2. Moreover, in the first estimated measurement result EM1 of Table 3, the phase (i.e., −202.77) of the channel "CH12+ RCH1" under the first control condition is, for example, the sum of the phase (i.e., −117.59) of the channel CH12 under the first control condition in Table 1 and the phase (i.e., −85.18) of the reference channel RCH1 in Table 2.

For those having ordinary knowledge in the art, the method for obtaining the contents of other fields in Table 3 should be deduced based on the above teachings, and is not repeated herein.

In step S340, after the first-stage device (such as the RF element RFU1) and the second-stage device (such as the multiplexer 11) are assembled into the RF device 10, a first post-assembly measurement result (hereinafter referred to as PM1) of the first channel of the RF device 10 under the first control condition is obtained.

In an embodiment of the invention, the first post-assembly measurement result PM1 includes, for example, the overall gain and phase of the first channel and the first reference channel of the RF device 10 under the first control condition (such as the overall gain and phase of the channel CH11 and the reference channel RCH1), but may be not limited to.

Moreover, the processor 204 may also obtain post-assembly measurement results of other channels on the RF device 10 and corresponding reference channels under the first control condition (and other control conditions).

In an embodiment of the invention, since the channels CH11 to CH14 of the RF element RFU1 are assumed to all be connected to the reference channel RCH1 of the multiplexer 11, the processor 204 may also obtain the post-assembly measurement result corresponding to each of the channels CH12 to CH14, and these post-assembly measurement results may be organized together with the first post-assembly measurement result PM1 into the following Table 4, for example.

TABLE 4

| Control condition | Channel | Gain (dB) | Phase (degrees) |
|---|---|---|---|
| First control condition | CH11 + RCH1 | 13.07 | 132.95 |
| | CH12 + RCH1 | 10.73 | 121.12 |
| | CH13 + RCH1 | 12.67 | 132.57 |
| | CH14 + RCH1 | N/A | N/A |
| Second control condition | CH11 + RCH1 | 7.86 | 133.08 |
| | CH12 + RCH1 | 5.52 | 121.25 |
| | CH13 + RCH1 | 7.47 | 132.8 |
| | CH14 + RCH1 | N/A | N/A |
| Third control condition | CH11 + RCH1 | −0.03 | 134.6 |
| | CH12 + RCH1 | 3 | 121.91 |
| | CH13 + RCH1 | 6.54 | 132.97 |
| | CH14 + RCH1 | N/A | N/A |
| Fourth control condition | CH11 + RCH1 | −0.05 | −141.49 |
| | CH12 + RCH1 | 3.32 | 25.07 |
| | CH13 + RCH1 | 6.95 | −48.15 |
| | CH14 + RCH1 | N/A | N/A |

Next, in step S350, the processor 204 performs a first calibration operation corresponding to the first channel based on the first estimated measurement result EM1 and the first post-assembly measurement result PM1.

In an embodiment, the processor 204 may obtain a first comparison result between the first estimated measurement result EM1 and the first post-assembly measurement result PM1, and perform a first calibration operation corresponding to the first channel based on the first comparison result.

In an embodiment, the processor 204 may obtain a first difference between the first estimated measurement result EM1 and the first post-assembly measurement result PM1 as the first comparison result.

For example, in the context of Table 3, the first estimated measurement result EM1 of the first channel (i.e., the channel CH11) includes a gain value of 13.55 dB and a phase value of −199.44 degrees. Moreover, in the context of Table 4, the first post-assembly measurement result PM1 of the first channel (i.e., the channel CH11) includes a gain value of 13.07 dB and a phase value of 132.95 degrees. Accordingly, the first difference between the first estimated measurement EM1 and the first post-assembly measurement PM1 includes, for example, a gain of 0.48 dB (i.e., 13.55-13.07) and a phase of 27.61 degrees (which is equivalent to (−199.44-132.95) degrees).

Based on a similar principle, the processor 204 may obtain comparison results between estimated measurement results and post-assembly measurement results corresponding to other channels. In an embodiment of the invention, the processor 204 may obtain various comparison results as shown in Table 5 below based on the contents of Table 3 and Table 4, for example.

TABLE 5

| Control condition | Channel | Gain (dB) | Phase (degrees) |
|---|---|---|---|
| First control condition | CH11 + RCH1 | 0.48 | 27.61 |
| | CH12 + RCH1 | 0.45 | 36.11 |
| | CH13 + RCH1 | 0.95 | 31.29 |
| | CH14 + RCH1 | N/A | N/A |
| Second control condition | CH11 + RCH1 | 0.56 | 28.34 |
| | CH12 + RCH1 | 0.47 | 36.79 |
| | CH13 + RCH1 | 1 | 31.95 |
| | CH14 + RCH1 | N/A | N/A |
| Third control condition | CH11 + RCH1 | 0.5 | 28.4 |
| | CH12 + RCH1 | 0.61 | 36.92 |
| | CH13 + RCH1 | 1.03 | 32.1 |
| | CH14 + RCH1 | N/A | N/A |
| Fourth control condition | CH11 + RCH1 | 0.71 | 29.47 |
| | CH12 + RCH1 | 0.53 | 37.21 |
| | CH13 + RCH1 | 1.18 | 32.59 |
| | CH14 + RCH1 | N/A | N/A |

In an embodiment of the invention, the processor 204 may respectively subtract the gain and phase in row i of Table 4 from the gain and phase in row i of Table 3 to obtain the gain and phase in row i of Table 5. In the context of Table 3 to Table 5, i is, for example, an integer not less than 1 and not more than 16, but may be not limited thereto.

For example, the processor 204 may subtract the gain (i.e., 13.07) and the phase (i.e., 132.95) of the first row in Table 4 from the gain (i.e., 13.55) and the phase (i.e., −199.44) of the first row in Table 3, respectively, to obtain the gain (i.e., 0.48) and the phase (i.e., 27.61) of the first row in Table 5. As another example, the processor 204 may subtract the gain (i.e., 12.67) and the phase (i.e., 132.57) of the third row in Table 4 from the gain (i.e., 13.62) and the phase (i.e., −196.14) of the third row in Table 3, respectively, to obtain the gain (i.e., 0.95) and the phase (i.e., 31.29) of the third row in Table 5. The gains and the phases in the other rows of Table 5 should be deduced according to the above teachings, and details are not repeated herein.

Next, the processor 204 may, for example, perform a calibration operation corresponding to at least one of the channels CH11 to CH14 based on the content of Table 5.

In an embodiment, when the processor 204 performs the calibration operation corresponding to the channel CH1 based on Table 5, the gain (i.e., 0.48) and the phase (i.e., 27.61) corresponding to the first control condition may respectively be compensated to normalize the gain and the phase to 0 dB and 0 degrees, respectively. Similarly, when the processor 204 performs the calibration operation corresponding to the channel CH2 based on Table 5, the gain (i.e., 0.45) and the phase (i.e., 36.11) corresponding to the first control condition may respectively be compensated to normalize the gain and the phase to 0 dB and 0 degrees, respectively. Moreover, when the processor 204 performs the calibration operation corresponding to the channel CH3 based on Table 5, the gain (i.e., 0.95) and the phase (i.e., 31.29) corresponding to the first control condition may respectively be compensated to normalize the gain and the phase to 0 dB and 0 degrees, respectively.

In an embodiment, after the calibration operation of the channels CH1 to CH3 is completed according to the above teaching, the processor 204 may measure the RF device 10 again to obtain each normalized gain difference and phase difference as shown in Table 6 below.

TABLE 6

| Control condition | Channel | Normalized gain difference | Normalized phase gain difference |
|---|---|---|---|
| First control condition | CH11 + RCH1 | 0 | 0 |
| | CH12 + RCH1 | 0 | 0 |
| | CH13 + RCH1 | 0 | 0 |
| | CH14 + RCH1 | N/A | N/A |
| Second control condition | CH11 + RCH1 | 0.08 | 0.73 |
| | CH12 + RCH1 | 0.02 | 0.68 |
| | CH13 + RCH1 | 0.05 | 0.66 |
| | CH14 + RCH1 | N/A | N/A |
| Third control condition | CH11 + RCH1 | 0.02 | 0.79 |
| | CH12 + RCH1 | 0.16 | 0.81 |
| | CH13 + RCH1 | 0.08 | 0.81 |
| | CH14 + RCH1 | N/A | N/A |
| Fourth control condition | CH11 + RCH1 | 0.23 | 1.86 |
| | CH12 + RCH1 | 0.08 | 1.1 |
| | CH13 + RCH1 | 0.23 | 1.3 |
| | CH14 + RCH1 | N/A | N/A |

It may be seen from Table 6 that, although in the above teachings, calibration (for example, compensation) is performed only based on the gain and the phase corresponding to the first control condition in Table 5, the gain and the phase corresponding to other control conditions are also calibrated/compensated correspondingly to obtain a gain difference and a phase difference close to 0.

Moreover, although it is assumed in the above embodiments that the calibration is performed based on the gain and the phase corresponding to the first control condition in Table 5, in other embodiments, the calibration of each channel may also be performed based on the gain and the phase corresponding to another control condition (e.g., the second control condition) instead. In this case, the gain and the phase corresponding to other control conditions are also adjusted/compensated correspondingly, so as to obtain a gain difference and a phase difference close to 0.

It may be known from the above that, in an embodiment of the invention, the compensation for the other control conditions may be correspondingly completed substantially simply by compensating the measurement result of one of the control conditions after the RF device 10 is assembled. Therefore, compared with the conventional way of measuring and compensating the RF device 10 after assembly with different control conditions, an embodiment of the invention may achieve better efficiency.

Moreover, since the conventional method is to perform the calibration of the whole machine after the RF device 10 is assembled, when any RF element and/or multiplexer in the RF device 10 fails, calibration of the whole machine needs to be performed again after the failed element/device is replaced, thus consuming more time and is inefficient.

However, via the method of an embodiment of the invention, only the new element/device needs to be calibrated after the faulty element/device is replaced with the new element/device, thereby achieving the effect of saving time and improving efficiency.

Although the above embodiments only take the first-stage device and the second-stage device as examples for illustration, in other embodiments, other devices (such as a third-stage device) may also be connected after the second-stage device, and other devices may also be connected before the first-stage device. In this case, the concepts taught in the above embodiments may still be applied to perform corresponding analysis and calibration.

Moreover, although only one second-stage device is shown in FIG. 1, the method proposed by an embodiment of the invention is also applicable to a situation in which there are a plurality of second-stage devices in the RF device 10.

Based on the above, the method of an embodiment of the invention may respectively obtain the measurement result of the channel on the first-stage device and the reference measurement result of the reference channel on the second-stage device before the first-stage device and the second-stage device are assembled into the RF device, and then determine the estimated measurement result by, for example, adding the measurement result and the reference measurement result.

After the first-stage device and the second-stage device are assembled into the RF device, an embodiment of the invention may further obtain the post-assembly measurement result of the channel and the reference channel, and may perform the calibration operation of the channel and the reference channel based on the comparison result between the estimated measurement result and the post-assembly measurement result. Therefore, the calibration time and efficiency of the RF device after assembly may be improved.

From another perspective, when a parallel transmission line network as shown in FIG. 1 exists in an RF device having a multi-stage structure, it generally takes a lot of time to perform a rather complicated calibration procedure on the RF device after installation. However, via the method proposed by an embodiment of the invention, the time for calibrating the RF device may be effectively reduced, thereby improving the related calibrating efficiency.

What is claimed is:

1. A radio frequency (RF) device calibration method, comprising:

obtaining a first measurement result (M1) of a first channel of a first-stage device under a first control condition;

obtaining a first reference measurement result (RM1) of a first reference channel of a second-stage device, wherein the first channel corresponds to the first reference channel, and the first measurement result (M1) and the first reference measurement result (RM1) are measured before the first-stage device and the second-stage device are assembled into an RF device (10);

determining a first estimated measurement result (EM1) corresponding to the first channel based on the first measurement result (M1) and the first reference measurement result (RM1);

obtaining a first post-assembly measurement result (PM1) of the first channel of the RF device (10) under the first control condition after the first-stage device and the second-stage device are assembled into the RF device (10); and performing a first calibration operation corresponding to the first channel based on the first estimated measurement result (EM1) and the first post-assembly measurement result (PM1).

2. The method of claim 1, wherein the first measurement result (M1) comprises a first gain and a first phase of the first channel under the first control condition, and the first reference measurement result comprises a first reference channel gain and a first reference channel phase of the first reference channel.

3. The method of claim 1, wherein the step of obtaining the first reference measurement result (RM1) of the first reference channel of the second-stage device comprises:

obtaining a measurement result of the first reference channel of the second-stage device under the first control condition as the first reference measurement result (RM1).

4. The method of claim 1, wherein the step of determining the first estimated measurement result (EM1) corresponding to the first channel based on the first measurement result (M1) and the first reference measurement result (RM1) comprises:

obtaining the first estimated measurement result (EM1) corresponding to the first channel by adding the first measurement result (M1) and the first reference measurement result (RM1).

5. The method of claim 1, wherein the step of performing the first calibration operation corresponding to the first channel based on the first estimated measurement result (EM1) and the first post-assembly measurement result (PM1) comprises:

obtaining a first comparison result between the first estimated measurement result (EM1) and the first post-assembly measurement result (PM1); and performing the first calibration operation corresponding to the first channel based on the first comparison result.

6. The method of claim 5, wherein the step of obtaining the first comparison result between the first estimated measurement result (EM1) and the first post-assembly measurement result (PM1) comprises:

obtaining a first difference between the first estimated measurement result (EM1) and the first post-assembly measurement result (PM1) as the first comparison result.

7. The method of claim 1, further comprising:

obtaining a second measurement result of a second channel of the first-stage device under the first control condition, wherein the second channel corresponds to the first reference channel, and the second measurement result is measured before the first-stage device and the second-stage device are assembled into the RF device (10);

determining a second estimated measurement result corresponding to the second channel based on the second measurement result and the first reference measurement result (RM1);

obtaining a second post-assembly measurement result of the second channel of the RF device (10) under the first control condition after the first-stage device and the second-stage device are assembled into the RF device (10);

performing a second calibration operation corresponding to the second channel based on the second estimated measurement result and the second post-assembly measurement result.

8. The method of claim 1, wherein at least one of the first measurement result (M1), the first reference measurement result (RM1), the first estimated measurement result (EM1), and the first post-assembly measurement result (PM1) is recorded into a corresponding table.

9. The method of claim 1, wherein the first channel of the first-stage device is configured to connect to a reference channel of the second-stage device when the first-stage device and a second-stage device are assembled into the RF device.

* * * * *